United States Statutory Invention Registration [19]

[11] Reg. Number: H649

Bamberger [43] Published: Jul. 4, 1989

[54] PREPARING TITANIUM NITRIDE POWDER

[75] Inventor: Carlos E. Bamberger, Oak Ridge, Tenn.

[73] Assignee: The United States of America as represented by the United States Department of Energy, Washington, D.C.

[21] Appl. No.: 207,806

[22] Filed: Jun. 17, 1988

[51] Int. Cl.[4] ..... C01G 23/00

[52] U.S. Cl. ..... 423/70; 423/81; 423/411

*Primary Examiner*—Stephen J. Lechert, Jr.
*Assistant Examiner*—Eric Jorgensen
*Attorney, Agent, or Firm*—Katherine P. Lovingood; Stephen D. Hamel; Judson R. Hightower

[57] ABSTRACT

A process for making titanium nitride powder by reaction of titanium phosphates with sodium cyanide.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREPARING TITANIUM NITRIDE POWDER

This invention is a process for making TiN powder from boron phosphate, titanium oxide and sodium cyanide and was developed pursuant to a contract with the U.S. Department of Energy.

BACKGROUND

Titanium nitride is a compound having a high melting point of 2950° C., a hardness of 8–9 in Moh's scale, exhibits good electrical conductance and is stable at high temperatures in inert atmospheres. It is known that sodium cyanide reacts at high temperatures with oxides such as $BPO_4$, $SiO_2$ and $TiO_2$ to yield, respectively, BN, Si C and TiN and sodium salts of oxyanions. However, in the process of forming TiN from $TiO_2$, salts such as $Na_2Ti_6O_{13}$ and $Na_8Ti_5O_{14}$ are also formed which are difficult to separate from TiN, the product of interest. Therefore there is a need to develop a process for making TiN that does not produce byproducts that interfere with obtaining the final product.

SUMMARY OF THE INVENTION

In view of the above need, it is an object of this invention to provide a process for making TiN but not interfering byproducts.

It is another object of this invention to provide a process for preparing TiN which produces no byproducts that cannot be removed by dissolution in water. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise mixing one or more phosphates of Ti with a cyanide salt in the absence of oxygen and heating to a temperature sufficient to cause reaction to occur. In the preferred embodiment the ratio of cyanide salt to Ti should be at least 2 which results in the major Ti-containing product being TiN rather than sodium titanium phosphate byproducts. The process is an improvement over prior processes since the byproducts are water soluble salts of sodium which can easily be removed from the preferred TiN product by washing.

DETAILED DESCRIPTION OF THE PREFERRED EMBODIMENT

Since sodium salts are generally water soluble, applicant decided to try to prepare TiN with starting materials that would result in sodium salt byproducts that would be amenable to removal using a water wash. Applicant had previously prepared boron nitride by reaction of sodium cyanide and boron phosphate; therefore, an attempt was made to use a similar reaction with phosphates of titanium. Since boron and titanium are no chemically similar one cannot predict the behavior of titanium compounds by the behavior of corresponding boron compounds. Also, the free energies of TiN and TiC are not far enough apart to be able to predict the product of the reaction. As a matter of fact, it would not have been surprising to obtain TiCN as the product.

EXAMPLE

Titanium phosphates $TiP_2O_7$ and $(TiO)_2P_2O_7$ were prepared by reacting $TiO_2$, anatase, with $BPO_4$ at about 1100° C. The byproduct $B_2O_3$ was removed by dissolution with water and the residue was washed with acetone and dried at 120° C.

When titanium phosphates $TiP_2O_7$ and $(TiO)_2P_2O_7$ were mixed with NaCN and heated to about 1000° C. a TiN product was obtained. With an NaCN to Ti ratio of about 1 the reaction led to the formation of small amounts of TiN while forming primarily other compounds of titanium. Some of the compounds such as $Na_{0.23}TiO_2$ (titanium bronze) and $NaTi_2(PO_4)3$ were identifiable by x-ray diffraction (XRD) by comparing with data in the literature. It should be noted that in some instances XRD identified the titanium bronze as $Na_2Ti_2Ti_6O_{16}$ ($Na_{0.25}TiO_2$). A comparison of the XRD patterns available for three titanium bronzes shows significant similarities and suggests that there is some ambiguity with respect to the exact stoichiometry of these compounds. Some other products of the reaction were not identifiable by XRD and consequently a research program aimed at their synthesis and characterization was initiated. This led to the identification of two novel compounds, $Na_4(TiO)(PO_4)_2$ and $Na(TiO)PO_4$.

It was necessary to maintain an excess of NaCN, at least at a 2 to 1 ratio, in order to get a sufficient TiN yield and the higher the NaCN concentrations, the better the yield. The sodium phosphate by-products were easily removed by dissolving in water. Another important parameter was the length of time of heating at 1000° C.; exploratory experiments revealed that about 20 hours was sufficient for 300 mg of NaCN to completely react and/or decompose. Thus, this length of time was arbitrarily adopted for all experiments.

Results from reactions with NaCN to Ti ratios at greater than 2 indicated that the major Ti-containing product was TiN. The stoichiometries of the reactions occurring at 1000° C. between $TiP_2O_7$ or $(TiO)_2P_2O_7$ and increasing amounts of NaCN were estimated on the basis of identification by XRD and Raman spectroscopy of solid products as major phases and the measured amounts of carbon dioxide evolved. Additionally, the presence of $Na_2C_2$ condensed in the cooler part of the apparatus was confirmed, on reaction with water, by the characteristic odor of gas released (similar to industrial $C_2H_2$ containing traces of $PH_3$), the high alkalinity of the resulting solution and the occasional spontaneous ignition of evolving acetylene. The evolution of phosphorous was confirmed by the presence of $Ni_2P$, identified by XRD. When TiN and $Na_{0.23}TiO_2$ were present in concentrations below limits of detection of XRD and Raman spectroscopy, they were identified by optical microscopy as gold and dark blue crystals, respectively. Other unidentified products (N, CO, P) and solid products present as minor phases were inferred from material balance of the elements. The amount of each product, given in moles in Table 1, was estimated by iterative calculations which used, as input, the data of measured weight losses from the reaction and from water extraction of products.

TABLE 1

| Reaction No. | Titanium compound | NaCN to Ti ratio | TiN | $Na_3PO_4$ | $CO_2$ | $Na_2C_2$ | $N_2$ | P | C | $Na_4(TiO)(PO_4)_2$ | $Na_{0.23}TiO_2$ | CO |
|---|---|---|---|---|---|---|---|---|---|---|---|---|
| | | Amounts of products calculated for the reaction of NaCN with various titanium phosphates | | | | | | | | | | |
| 1* | $TiP_2O_7$ | 1 | 0.05 | 0.06 | 0.35 | 0 | 0.48 | 0.54 | 0.29 | 0.10 | 0.05 | 0.36 |
| 2** | $TiP_2O_7$ | 2 | 0.50 | 0.15 | 0.37 | 0 | 0.75 | 1.09 | 0 | 0.38 | 0.12 | 2.00 |
| 3 | $TiP_2O_7$ | 4 | 1.00 | 1.33 | 0.50 | 0 | 1.50 | 0.67 | 2.82 | 0 | 0 | 0.68 |
| 4*** | $(TiO)_2P_2O_7$ | 1 | 0 | 0 | 0.60 | 0 | 1 | 1.08 | 0.72 | 0.36 | 1.64 | 0.68 |
| 5 | $(TiO)_2P_2O_7$ | 2 | 1.85 | 1.25 | 0.40 | 0 | 1.08 | 0.65 | 1.05 | 0.05 | 0.10 | 2.55 |
| 6 | $(TiO)_2P_2O_7$ | 3 | 2.00 | 1.75 | 1.00 | 0.38 | 2.00 | 0.25 | 4.24 | 0 | 0 | 0 |
| 7§ | $(TiO)_2P_2O_7$ | 4 | 2.00 | 1.40 | 0.40 | 1.63 | 2.73 | 0.60 | 1.20 | 0 | 0 | 2.60 |
| 8 | $Na_4(TiO)(PO_4)_2$ | 3 | 1.00 | 1.80 | 0.40 | 0.80 | 1.00 | 0.20 | 0 | 0 | 0 | 1.00 |
| 9 | $NaTi_2(PO_4)_3$ | 2 | 2.00 | §§ | 2.00 | 0.50 | 1.00 | 1.00 | 0 | 0 | 0 | 1.00 |

*0.40 $NaTi_2(PO_4)_3$ also present among products.
**Includes 0.37 C as reactant from container.
***0.20 $NaPO_3$ also present among products.
§0.54 NaCN also present among products.
§§Found as 1.00 $Na_4P_2O_7$ (=$Na_3PO_4$ + $NaPO_3$).

Although these calculated amounts are being reported to the second decimal place this was done for calculational purposes only and should not be taken as an indication of accuracy with which they are known. The state of knowledge concerning the species present (identified and inferred) and their respective amounts, can be surmised from the data in Table 2 in which the comparison is made between the measured and calculated values of weight losses from the reaction and from water extraction of the products. Taking into consideration that the studied reactions are time dependent and involve a large number of products, the agreement between those values is quite satisfactory.

TABLE 2

Typical calculated and measured values of weight loss from the reaction and by water extraction of reaction products for reactions of NaCN with titanium phosphates

| Reaction No. | % Weight loss on reaction | | % Weight loss by water extraction of reaction products | |
|---|---|---|---|---|
| (in Table 1) | Calculated | Measured | Calculated | Measured |
| 1 | 20.7 | 23.5 | 4.6 | 9.7 |
| | | 20.3 | | 7.1 |
| 2 | 39.2 | 36.6 | 12.5 | 19.6 |
| | | 35.2 | | 12.7 |
| 3 | 24.8 | 30.1 | 69.4 | 71.5 |
| | | 30.2 | | 66.2 |
| 4 | 26.7 | 25.4 | 7.0 | 8.2 |
| | | 26.1 | | 6.1 |
| 5 | 28.0 | 27.0 | 57.2 | 64.1 |
| | | 29.0 | | 64.3 |
| 6 | 28.3 | 22.5 | 62.1 | 63.4 |
| 7 | 43.2 | 42.9 | 64.9 | 61.6 |
| 8 | 27.6 | 22.7 | 82.7 | 82.5 |

TABLE 2-continued

Typical calculated and measured values of weight loss from the reaction and by water extraction of reaction products for reactions of NaCN with titanium phosphates

| Reaction No. | % Weight loss on reaction | | % Weight loss by water extraction of reaction products | |
|---|---|---|---|---|
| (in Table 1) | Calculated | Measured | Calculated | Measured |
| 9 | 35.0 | 35.9 | 68.2 | 72.9 |

It can also be seen in Table 1 that the amount of titanium present as double phosphates $NaTi_2(PP_4)_3$ and $Na_4(TiO)(PO_4)_2$ decreases with increasing values of the NaCN to Ti ratios. To confirm that the presence among reaction products of such double phosphates (e.g. reactions 1, 2, 4 and 5) implies not having sufficient NaCN in the system, applicant reacted NaCN with $Na_4(TiO)(PO_4)_2$ and with $NaTi_2(PO_4)_3$. The results are shown in Table 1, reactions 8 and 9; it can be seen that the conversion of the titanium from the double phosphates into TiN was complete. Examination of the TiN powders with a scanning microscope showed that the powders consist of a mixture of loose submicron particles and larger agglomerates of 30–40 m in their longest axis.

I claim:

1. A process for making titanium nitride comprising mixing one or more phosphates of Ti with a cyanide salt in the absence of oxygen and heating for a time sufficient and to a temperature sufficient to cause reaction to occur.

2. The process of claim 1 wherein said cyanide salt is present relative to said phosphates of Ti in a ratio of 2 or greater.

3. The process of claim 2 wherein said time is not less than 24 hours and said temperature is not less than 1000° C.

4. The process of claim 3 wherein said cyanide salt is sodium cyanide.

5. The process of claim 4 wherein said phosphates of Ti are $TiP_2O_7$ and $(TiO)_2P_2O_7$.

* * * * *